(12) United States Patent
Janáky et al.

(10) Patent No.: US 11,718,921 B2
(45) Date of Patent: Aug. 8, 2023

(54) MODULAR ELECTROLYZER UNIT TO GENERATE GASEOUS HYDROGEN AT HIGH PRESSURE AND WITH HIGH PURITY

(71) Applicant: THALESNANO ENERGY ZRT., Budapest (HU)

(72) Inventors: Csaba Janáky, Szeged (HU); Egon Kecsenovity, Horgos (RS); Antal Danyi, Szeged (HU); Balázs Endrödi, Szeged (HU); Viktor Török, Szeged (HU); Ferenc Darvas, Budapest (HU); Richard Jones, Budapest (HU)

(73) Assignee: THALESNANO ZRT, Budapest (HU)

( * ) Notice: Subject to any disclaimer, the term of this patent is extended or adjusted under 35 U.S.C. 154(b) by 0 days.

(21) Appl. No.: 17/269,896

(22) PCT Filed: Aug. 20, 2018

(86) PCT No.: PCT/HU2018/050036
§ 371 (c)(1),
(2) Date: Feb. 19, 2021

(87) PCT Pub. No.: WO2020/039218
PCT Pub. Date: Feb. 27, 2020

(65) Prior Publication Data
US 2021/0310136 A1    Oct. 7, 2021

(51) Int. Cl.
C25B 9/05    (2021.01)
C25B 9/19    (2021.01)
(Continued)

(52) U.S. Cl.
CPC ............... *C25B 9/05* (2021.01); *C25B 1/04* (2013.01); *C25B 9/19* (2021.01); *C25B 9/75* (2021.01); *C25B 9/77* (2021.01); *C25B 15/083* (2021.01)

(58) Field of Classification Search
None
See application file for complete search history.

(56) References Cited

U.S. PATENT DOCUMENTS 4,720,331 A * 1/1988 Billings .................... C25B 9/73
                                                                    204/266
5,690,797 A * 11/1997 Harada .................... C25B 1/04
                                                                    204/266
(Continued)

FOREIGN PATENT DOCUMENTS

CN    105862066    8/2016
EP     0659218     3/1997
(Continued)

OTHER PUBLICATIONS

Grigoriev et al., Hydrogen safety aspects related to high-pressure polymer electrolyte membrane water electrolysis, International Journal of Hydrogen Energy, vol. 34, No. 14, Jul. 2009, pp. 5986-5991 (Year: 2009).*

(Continued)

*Primary Examiner* — Harry D Wilkins, III
(74) *Attorney, Agent, or Firm* — Fitch, Even, Tabin & Flannery LLP

(57) ABSTRACT

The present invention relates to the field of generating gaseous hydrogen at high pressures and with high purity via electrolysis of water by means of an electrolyzer unit (100) with a novel structure.

12 Claims, 9 Drawing Sheets

(51) Int. Cl.
*C25B 1/04* (2021.01)
*C25B 9/75* (2021.01)
*C25B 9/77* (2021.01)
*C25B 15/08* (2006.01)

(56) References Cited

U.S. PATENT DOCUMENTS

| | | | |
|---|---|---|---|
| 5,783,051 | A | 7/1998 | Hirai |
| 6,878,244 | B2 * | 4/2005 | Sioli ............... C25B 9/77 204/269 |
| 7,846,307 | B2 | 12/2010 | Taruya |
| 7,951,284 | B2 * | 5/2011 | Nakazawa ........... B22F 3/1146 205/640 |
| 8,282,811 | B2 | 10/2012 | Kosek |
| 10,208,385 | B2 | 2/2019 | Kudo |
| 2005/0115825 | A1 | 6/2005 | Frank |
| 2007/0015035 | A1 | 1/2007 | Izenson |
| 2011/0042228 | A1 | 2/2011 | Hinatsu |
| 2011/0266142 | A1 | 11/2011 | Norman |
| 2013/0032472 | A1 | 2/2013 | Hoeller |
| 2013/0105304 | A1 | 5/2013 | Kaczur |
| 2016/0369415 | A1 | 12/2016 | Masel |
| 2017/0321334 | A1 | 11/2017 | Kuhl |
| 2018/0195185 | A1 | 7/2018 | Kazarian |
| 2018/0274109 | A1 | 9/2018 | Kudo |
| 2019/0127865 | A1 | 5/2019 | Li |

FOREIGN PATENT DOCUMENTS

| | | |
|---|---|---|
| EP | 3375907 | 9/2018 |
| FR | 2466515 A1 | 4/1981 |
| JP | 2013525604 | 6/2013 |
| JP | 2016044353 | 4/2016 |
| WO | 2015102479 | 7/2015 |
| WO | 2017176600 | 10/2017 |
| WO | 2018071818 | 4/2018 |
| WO | 2019051609 | 3/2019 |
| WO | 2020240218 | 12/2020 |

OTHER PUBLICATIONS

Written Opinion of the International Searching Authority; dated May 24, 2019 for PCT/HU2018/050036; 7 pages.
International Search Report; dated May 24, 2019, for PCT/HU2018/050036; 3 pages.
International Preliminary Report on Patentability; completed Jan. 20, 2021, for PCT/HU2018/050036; 8 pages.
Marcelo Carmo et al: "A comprehensive review on PEM water electrolysis", International Journal of Hydrogen Energy., vol. 38, No. 12, Mar. 14, 2013 (Mar. 14, 2013), pp. 4901-4934, XP055227116, GB ISSN: 0360-3199, DOI: 10.1016/j.ijhydene.2013.01.151; Abstract 3 pages. A p. 4905, paragraph 1.3.2.
International Preliminary Report on Patentability for PCT/HU2018/050036, dated Mar. 19, 2021, 19 pages.
Marcelo Carmo et al: "A comprehensive review on PEM water electrolysis", International Journal of Hydrogen Energy., vol. 38, No. 12, Mar. 14, 2013 (Mar. 14, 2013), pp. 4901-4934, XP055227116, GB ISSN: 0360-3199, DOI: 10.1016/j.ijhydene.2013.01.151, 34 pages.
B. Endrődi, et al; "Continuous-Flow Electroreduction of Carbon Dioxide"; Progress in Energy and Combustion Science 62, (2017) 13 , pp. 133-154.
International Report on Patentability for PCT/HU2019/095001 completed Jun. 22, 2021, 5 pages.
Written Opinion of International Searching Authority for PCT/HU2019/095001, dated Dec. 3, 2020, 7 pages.
International Search Report for PCT/HU2019/095001, dated Dec. 3, 2020, 3 pages.
Japanese Patent Office; Notice of Reasons for Refusal for JP Patent Application No. 2021-534833 dated Jul. 4, 2022; 8 pages.

* cited by examiner

MODULAR ELECTROLYZER UNIT TO GENERATE GASEOUS HYDROGEN AT HIGH PRESSURE AND WITH HIGH PURITY

CROSS REFERENCE TO RELATED APPLICATIONS

This application is the national phase of PCT/HU2018/050036 filed Aug. 20, 2018.

FIELD OF THE INVENTION

The present invention relates to the field of generating gaseous hydrogen at high pressures and with high purity via electrolysis of water. The invention also relates, thus, to a novel modular electrolyzer unit to perform said electrolysis, as well as a hydrogen generator that employs the electrolyzer unit.

BACKGROUND ART

New hydrogen generation technologies are being driven by the move towards the use of hydrogen as an energy carrier. Water electrolysis by means of polymer-electrolyte membranes (PEM) arranged between cathode and anode plates is a promising hydrogen generation technique, a comprehensive review on PEM water electrolysis is provided in the International Journal of Hydrogen Energy 38 (2013) pp. 4901-4934.

U. S. Published Patent Appl. No. 2011/0266142 A1 discloses a unitized electrolyzer apparatus for generating hydrogen gas at high pressures. According to one embodiment, the apparatus includes a pressure-containment vessel, a water electrolyzer stack, and a water supply. The water electrolyzer stack is mounted on or in the vessel and is used to generate hydrogen gas for containment in the vessel at high pressure. The water supply is contained within the vessel, the water supply being fluidly coupled to the water electrolyzer stack to provide a cathode feeding of water to the water electrolyzer stack. Although, a gaseous hydrogen of relatively high pressure (up to about 340 bar) can be produced with the apparatus, the level of purity of the obtained gas is not available.

U. S. Published Patent Appl. No. 2005/0115825 A1 relates to electrolyzer cells in which distribution of water over the surface of an electrolyte layer (e.g. a MEA) is improved. Specifically, there is provided an electrolyzer cell including: an anode flow field plate; a cathode flow field plate; an electrolyte layer arranged between the anode and cathode flow field plates; and first and second flat screens arranged between the anode flow field plate and the electrolyte layer, wherein each of the screens has a respective number of openings and is electrically conductive. Due to this construction, water is more uniformly distributed across an active surface of an electrolyte layer, which in turn may lead to a more uniform reaction rate over the active area of the electrolyte layer. Neither the pressure of the gaseous hydrogen produced, nor the level of purity is available.

In literature, it is a known issue to produce gaseous hydrogen at high pressure via electrolysis. Pressure handling is typically ensured by employing pressure-containment vessels (see above), very thick and massive endplates (e.g. U.S. Pat. No. 5,783,051), moving pistons (e.g. U.S. Pat. No. 7,846,307 B2), externally located spring-operated overflow valves (e.g. EP-0,659,218 B1), separate pressurizing gases, such as nitrogen (e.g. FR-2,466,515), highly complicated pressure control and regulation systems (CN Appl. No. 105862066 A), etc. just to mention some solutions. These solutions are cumbersome, and in some cases are not reliable enough to operate in an autonomous manner without human monitoring and intervention.

It is a known further issue to produce gaseous hydrogen with high purity. To this end, it is well accepted practice to apply $H_2/O_2$ recombiners either in the membrane itself, or on the back side of the titan-frit employed within the cell, or alternatively outside the cell, in the form of external recombiners. None of these solutions proves, however, satisfactory. In particular, a recombiner within the membrane will gradually destroy the membrane and thus shortens its lifetime. Application in the form of a backing on the titan-fit becomes insufficient at higher pressures. Making use of external recombiners significantly raises the costs of the $H_2$ generation, requires extra place which is not available within the instrument and may even be dangerous due to the fact that the hydrogen gas has to travel from the cell to the recombiner through the instrument.

In light of the aforementioned, it is an object of the present invention to provide a novel electrolyzer unit.

It is another object of the present invention is to provide an electrolyzer unit that addresses at least some of the shortcomings associated with the above-described known solutions.

It is still another object of the present invention to provide an electrolyzer unit that reliably handles high differential pressures within the unit.

It is still another object of the present invention to provide an electrolyzer unit that is capable of generating gaseous hydrogen with high purity and at variable production rate.

It is still another object of the present invention to provide a stack-based electrolyzer unit, especially a modular electrolyzer unit with a multiplicity of electrolyzing cells that can be manufactured relatively simply and inexpensively.

A yet further object of the present invention is to provide an electrolyzer unit of high flexibility in terms of e.g. the membrane element used in the unit when replacement of said membrane element arises.

A yet further object of the present invention is to provide an electrolyzer unit that can be easily and simply restructured according to needs if a change in the required rate of gas production or even in the type of gaseous substance arises.

Additional objects, as well as aspects, features and advantages, of the present invention will be set forth in the description which follows.

SUMMARY OF THE INVENTION

In particular, the invention relates to new components and a new assembly of a water electrolyzer unit capable of operating at high differential pressures. It is based on the electrochemical reduction $(2H_3O^+ + 2e^- = H_2 + 2H_2O)$ and oxidation $(H_2O - 2e^- = 2H^+ + 0.5O_2)$ of water $(H_2O)$ on the cathode and anode sides, respectively. Due to the proposed technological novelties as well as the modular construction, the presented electrochemical unit architecture is highly scalable and flexible. The unit can be easily scaled up, both in terms of its size/dimensions and the number of cells made use of, while maintaining pressure tolerance. The catalytic recombiners integrated into each electrolyzer cell allow high gas purity over a wide range of pressures and $H_2$ flow-rates. This allows the application of the inventive electrolyzer unit in various industries, such as the chemical, pharmaceutical, and energy industry. High pressure and high purity are especially important in synthetic organic chemistry (both in pharmaceutical and chemical industries) and in the field of energy storage, especially in the automobile sector.

One of the new components made use of in the water electrolyzer unit according to the invention is a modular bipolar plate. Instead of the conventional single-item bipolar plates, two-component bipolar plate assemblies are employed in the unit, said assemblies being built up of two separate plate components fabricated also separately. Between the two components, circular cavities are introduced that were found to be effective gas transportation avenues to the channels connecting the adjacent cells of the stack. The two-component design results in thinner bipolar plates when assembled, and an overall lighter electrolyzer unit. In addition, if needed because of any reasons, the half of said bipolar plate assembly, i.e. one of its two components can be changed independently of the other component, further increasing thereby the flexibility of each cell of the stack of the unit.

A further new component employed in the water electrolyzer unit according to the invention is a $H_2/O_2$ recombiner that is integrated into the cavities formed within the separate components of the two-component bipolar plate assembly. The $H_2/O_2$ recombiner, provided in the form of a large surface mesh, helps to increase the purity of the gaseous streams ($H_2$, $O_2$) generated within the electrolyzer unit according to the invention by means of enhancing the catalytic recombination reaction between either gas and the minor traces of the other gas being present therein.

A yet further new component made use of in the water electrolyzer unit according to the invention is a custom designed and assembled current collector made of titan (Ti) frits (Ti-frits). Said Ti-flits are made of a catalyst-coated Ti powder provided in the form of individually coated Ti-particles of different average particle size, wherein a nanoparticulate catalyst is deposited by wet chemical processes on the surface of each Ti-particle before the Ti-flits are actually manufactured by pressing the catalyst-impregnated Ti-particles. In this way, the effective surface area of the active catalyst is significantly increased which results in the enhancement of the purity of the gaseous hydrogen generated in the electrolyzer unit according to the present invention.

A yet further new component applied in the water electrolyzer unit according to the invention is a fluid channel sealing assembly that provides a watertight sealing between two catalyst-coated membranes arranged in adjacent electrolyzer cells. It further provides a spacer element that can be simply matched with the actual thickness of the catalyst-coated membrane. Thus, to achieve perfect sealing of the unit even at higher pressures, there is no need to re-manufacture the other components of the electrolyzer unit, if replacement of the catalyst-coated membrane takes place.

A yet further new component optionally employed within the water electrolyzer unit according to the invention is a pressure chamber at both end of the unit formed within specific pressure chamber plates arranged at both ends of the unit. These special plates provide adaptive pressure control on the stack of cells from both sides, thus providing uniform pressure distribution throughout each cell of the stack. This construction inhibits deformation of the cell body, and thus avoids the decrease in the contact area between the internal components, such as e.g. the catalyst-coated membrane and the Ti-frit and/or the Ti-frit and a Ti-plate. This results in a stable cell resistance even at elevated pressures. Importantly, the application of said pressure chamber plates eliminates the requisite of any moving parts (such as pistons or valves) or elastic plastic elements as pressure controlling means within the unit, which is the current state-of-the-art. Furthermore, unlike any external pressure control, the employment of said pressure chamber plates is inherently safe, because the pressure in the pressure chambers formed in said pressure chamber plates can never be higher than that generated in the electrolyzing cells of the stack. It is found, however, that to ensure the pressure independent electrochemical performance, the pressure chambers have to be used in pairs, i.e. one at the cathode-side and another at the anode-side of the electrolyzer unit according to the invention.

BRIEF DESCRIPTION OF THE DRAWINGS

In what follows, the invention is described in detail with reference to the accompanying drawings, wherein.

DESCRIPTION OF POSSIBLE EMBODIMENTS

Figure 1:
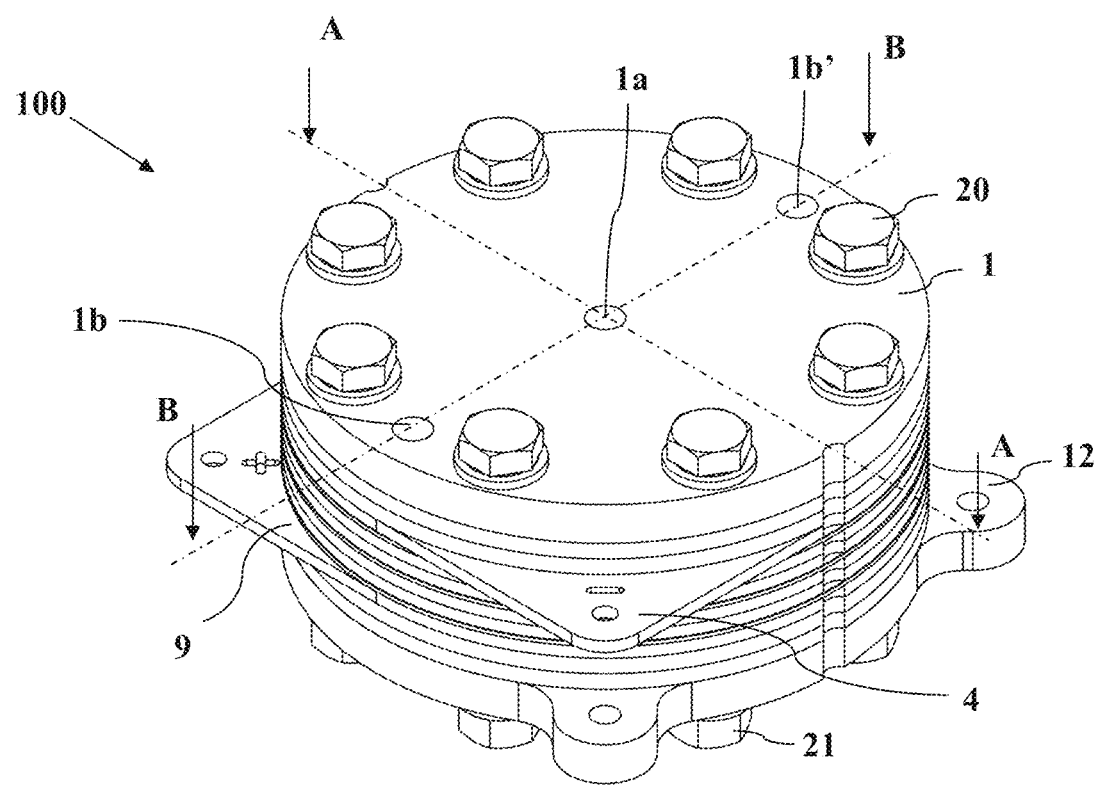
FIG. 1 is a complete perspective view of a specific exemplary embodiment of an electrolyzer unit according the invention with three electrolyzing cells used to generate gaseous hydrogen from water at high pressures and with high purities.
Figure 2:
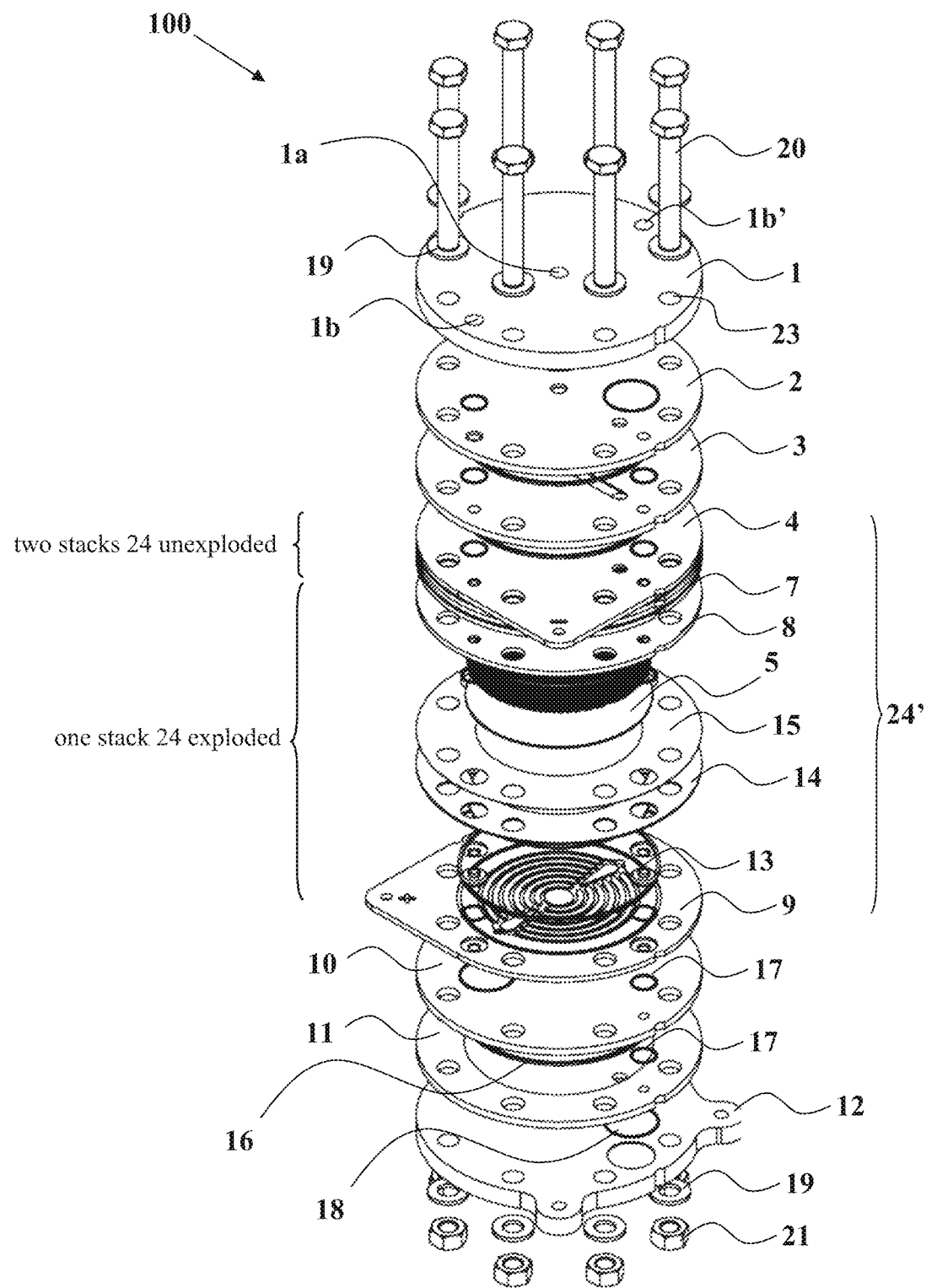
FIG. 2 is a partially exploded view of the electrolyzer unit exemplified in FIG. 1.
Figure 3A:
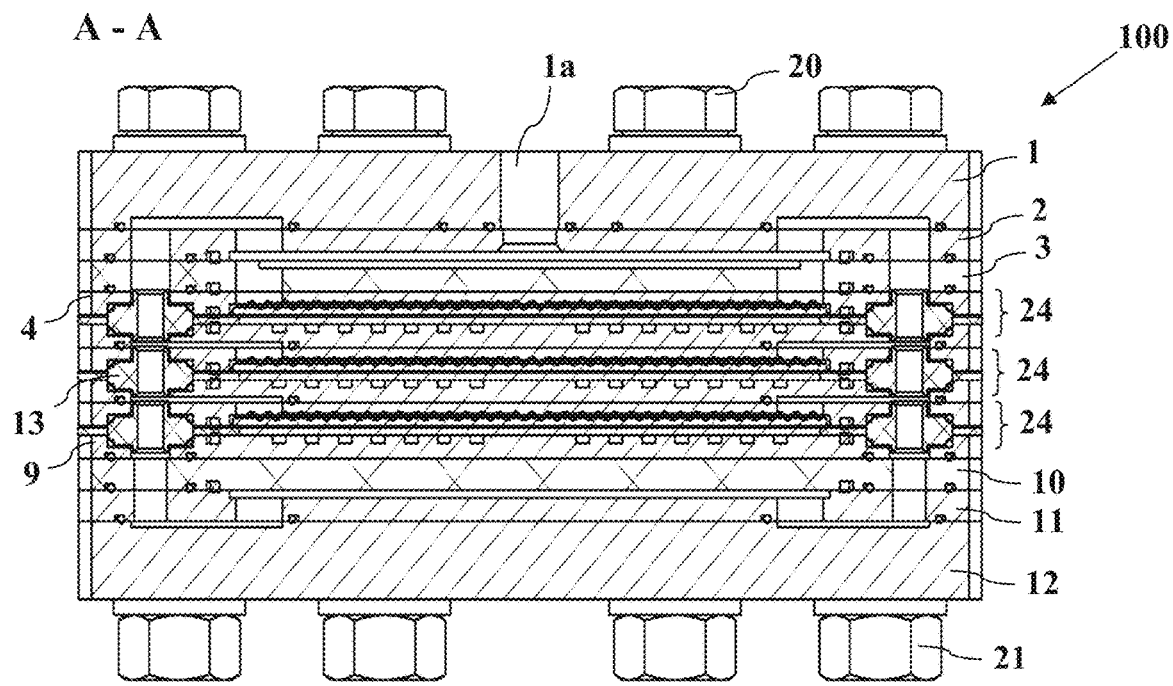
FIGS. 3A and 3B show various cross-sectional views A-A and B-B of the exemplary electrolyzer unit of FIG. 1 taken along the lines A-A and B-B, respectively.
Figure 3B:
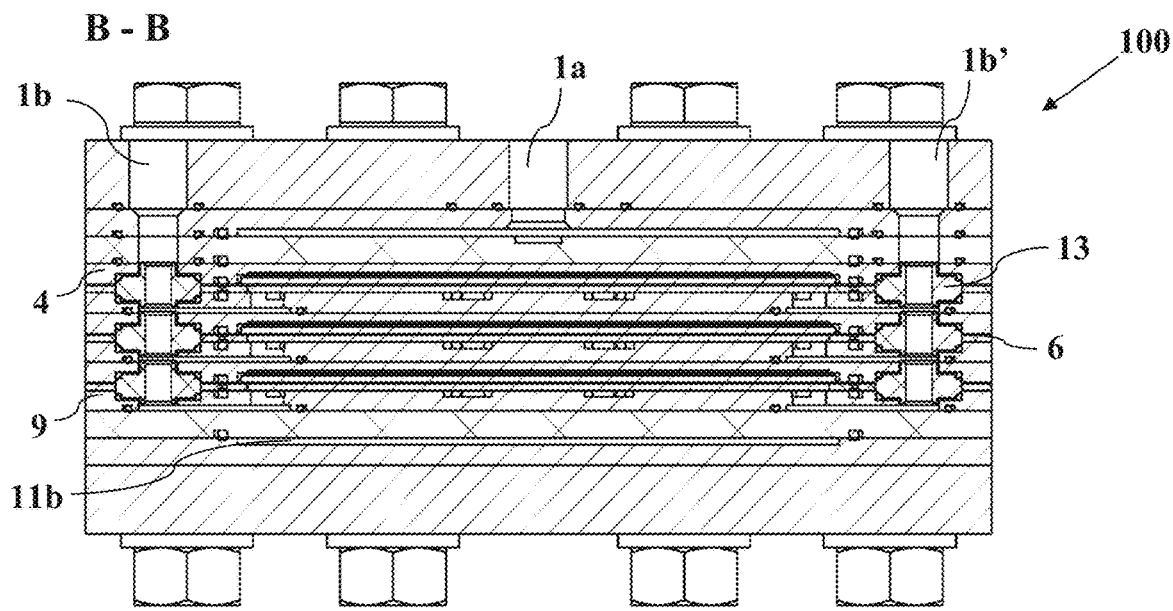

FIGS. 1 to 3 illustrate an exemplary embodiment of an electrolyzer (electrochemical) unit 100 according the invention used to generate gaseous hydrogen at high pressures and with high purities via the electrolysis of water introduced into said unit 100. In particular, FIG. 1 is the perspective view of the unit 100, while FIG. 2 and FIGS. 3A and 3B are a partial exploded view, a cross-sectional elevation taken along the A-A line and another cross-sectional elevation taken along the B-B line of said electrolyzer unit 100, respectively, shown in FIG. 1. For further reference, the cross-sectional elevation of FIG. 3A reveals the $H_2$ transport channel structure within the unit 100, while the cross-sectional elevation of FIG. 3B shows the water/$O_2$ transport channel structure. Furthermore, in FIGS. 1 to 3, for the sake of simplicity and clarity, an embodiment of the electrolyzer unit 100 comprising three electrolyzing cells 24 arranged adjacent to (on top of) one another and in fluid/gaseous connection with each other through channel sealing assemblies 13 is presented. It is, however, will be clear from the below detailed discussion of the unit 100 that it may be realized with basically any number n of electrolyzing cells. According to practical considerations, however, one chooses the number n to be at least one and at most twenty, preferably at most fifteen, more preferably at most ten; in particular, the number n of the applied cells in a stack is preferably between one and ten, more preferentially between three to eight in a single electrolyzer unit 100.

As can be seen in FIGS. 1 and 2, the electrolyzer unit 100 is of modular construction, the various components included are provided by plate-like elements of different function. The plate-like components may be of arbitrary planar shape, in the exemplary embodiment illustrated in FIG. 1, the components are essentially circular in shape. In what follows, the term "longitudinal" refers to a direction that is essentially perpendicular to the surface planes of said plate-like components. Thus, as is shown in FIG. 2, the plate-like components are provided with a plurality of through holes along the longitudinal direction. A part of said holes serves as bores 23 to receive screw-bolts 20 used to assemble the components into the electrolyzer unit 100 and then to connect said components in a sealed manner by means of washers 19 and screw-nuts 21 screwed onto the screw-bolts 20 inserted into the respective bores 23. The remaining part of said holes, being also properly aligned to one another and sealed by means of specific channel sealing assemblies 13 (detailed in below) insertable into the holes, serves to form a longitudinal flow-through portion of the water/$O_2$ and $H_2$ transport channel structures within the unit 100 to introduce water into each electrolyzing cell 24, as well as to drain excess water and gaseous oxygen from each cell 24 and to discharge gaseous hydrogen from each cell 24 upon the electrolytic reactions, and thus the decomposition of water take place in all cells 24 employed within the unit 100.

Figure 4A:
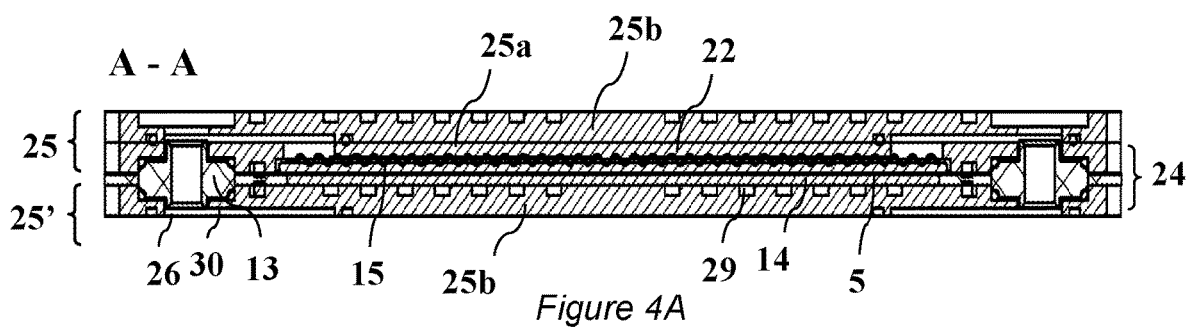
FIGS. 4A and 4B show various cross-sectional views A-A and B-B (see FIG. 1), respectively, of an intermediate electrolyzing cell employed in the unit that is built up of basically a first component of a first two-component bipolar plate assembly and a second component of a second two-component bipolar plate assembly that are arranged adjacent to each other.
Figure 4B:
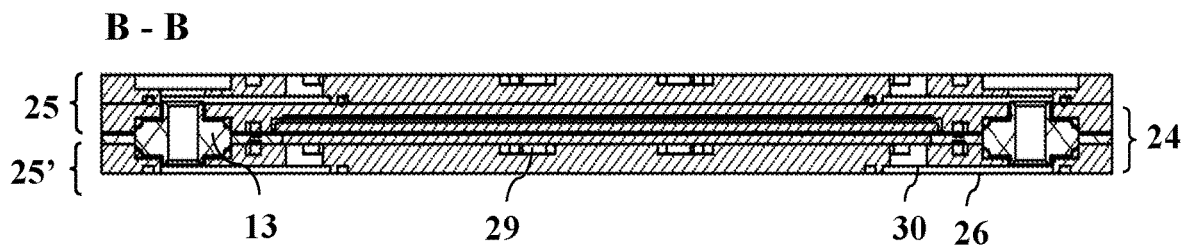

The electrolyzer unit 100 according to the invention is used to decompose water by electrolysis and thus to generate gaseous hydrogen. To this end, the unit 100 comprises a certain number n of electrolyzing cells 24 arranged adjacently and in fluid/gaseous communication with each other through the longitudinal portion of the water/$O_2$ and $H_2$ transport channel structures. Thus, the electrolyzer unit 100 contains a stack 24' of electrolyzing cells 24 comprising interconnected intermediate cells and two marginal cells, one at each side of said stack. The intermediate and the marginal cells are essentially of the same construction (see below in detail); each of the electrolyzing cells 24 is built up of a first component 25a of a first two-component bipolar plate assembly 25 and a second component 25b of a second two-component bipolar plate assembly 25' (not fully represented) that are arranged adjacent to each other, as shown in FIGS. 4A and 4B in the various cross-sectional views A-A and B-B (see FIG. 1), respectively.

Referring to FIGS. 1 to 3, the cells 24/stack 24' of cells form(s) the core structural element of the unit 100 that is sandwiched from its opposite sides along the longitudinal direction by a cathode plate 4 and an anode plate 9 used to introduce an electric current into the unit 100 required for the electrolysis. Here, the cathode plate 4 and the anode plate 9 are actually formed by the outermost metallic plate components of the marginal cells, but in other configurations, separate cathode/anode plates arranged in close contact with the outermost metallic component of the two marginal cells when the electrolyzer unit 100 is assembled may also be employed.

On the cathode-side of the unit 100, a cathode insulation plate 3 is arranged on said cathode plate 4, a (top) pressure chamber plate 2 with a pressure chamber is arranged on the cathode insulation plate 3 and a cathode-side endplate 1 completes the unit 100 in the series of the plate-like components. The endplate 1 is provided with appropriate openings that are in fluid/gaseous communication with the water/$O_2$ and $H_2$ transport channel structures of the unit 100. Said openings are formed by at least one water inlet 1b, at least one water/$O_2$ outlet 1b' and at least one $H_2$ outlet 1a.

On the anode-side of the unit 100, an anode insulation plate 10 is arranged on said anode plate 9, a (bottom) pressure chamber plate 11 with a pressure chamber is arranged on the anode insulation plate 10 and an anode-side endplate 12 completes the unit 100 in the series of the plate-like components.

To ensure a water- and gastight construction of the electrolyzer unit 100 in the assembled state under operation at high pressures, there are appropriate sealing means arranged in the unit 100 along the interconnecting flow-through channels between said plate-like components, preferably in the form of O-rings 16, 17, 18, sealing rings 6 and the channel sealing assemblies 13, as needed. Most of the sealing means are known to a skilled person in the art, the novel ones are discussed below in detail with reference to FIG. 7.

FIGS. 4A and 4B show simultaneously, in the A-A and B-B sections of FIG. 1, respectively, the assembly of one electrolyzing cell 24, as well as the assembly 25 of one bipolar plate. A single electrolyzing cell 24 comprises (in the order from the cathode-side to the anode-side of the unit 100 in FIG. 1): the first (bottom) component 25a of the bipolar plate assembly 25, a custom made spring 22 made of Ti, a custom made Ti-frit 15, a catalyst-coated membrane 5, a further custom made Ti-frit 14 and the second (top) component 25b of the bipolar plate assembly 25.

The first component 25a acts as the cathode in this cell (i.e. in cell i, when the whole stack of cells in the unit 100 is considered). The first component 25a is provided with gas channels 28 (see FIG. 6) machined, in particular CNC-milled into the surface of said first component 25a; the gas channels 28 direct the generated $H_2$ gas to the $H_2$ channel structure via the cavities 26. It is noted that the second component 25b of the bipolar plate assembly 25 acts as the anode in the cell above (i.e. in cell i–1).

Figure 10:
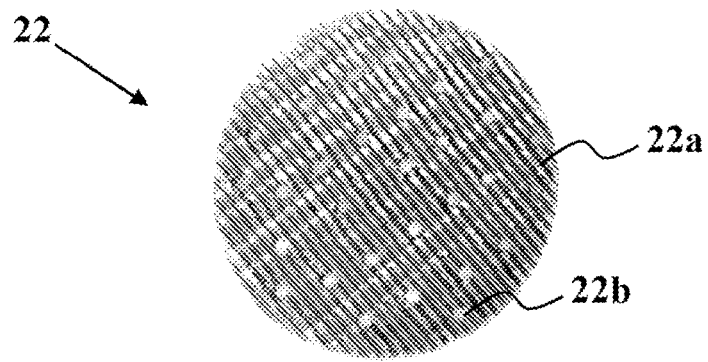
FIG. 10 illustrates the custom-designed and -made titan spring made use of in the electrolyzing unit according to the invention.

The custom made Ti-spring 22, shown in FIG. 10, contains both waves 22a and holes 22b to simultaneously ensure proper contact and gas flow. The spring 22 is made of a Ti-foil with a given thickness by first cutting holes with a regular pattern and density into the foil, and then by crimping the foil with an amplitude that is preferably about two times larger than the foil thickness.

The custom made Ti-frit 15 serves to connect the bipolar plate assembly 25 and the catalyst-coated membrane 5.

The catalyst-coated membrane 5 is provided with Pt/C on the cathode side, a proton conducting membrane, made preferably of e.g. Nafion (DuPont), and $Ir/IrO_x$ catalyst on the anode side. To avoid the leakage of $H_2$ gas from the edge of the catalyst-coated membrane 5, an O-ring 16 based sealing technology is employed. The catalyst-coated membrane 5 is commercially available (produced by e.g. Quintech e.K., Göppingen, Germany).

To achieve pressure management within the electrolyzing cell 24, in the assembled state of the unit 100, said Ti-spring 22 presses the Ti-frit 15 continuously to the catalyst-coated membrane 5, thereby providing a practically constant size contact area between the Ti-frit 15 and the catalyst-coated membrane 5. In this way, a high $H_2$ production rate can be maintained over long periods of time when the unit 100 is in operation.

The custom made Ti-frit 14 serves to connect the bipolar plate assembly 25 and the catalyst-coated membrane 5.

The second component 25b acts as the anode in this cell (i.e. in cell i). The second component 25b is provided with gas channels 29 (see FIG. 6) machined, in particular CNC-milled into the surface thereof; the gas channels 29 direct the generated $O_2$ gas (and the residual water) to the water/$O_2$ channel structure via cavities 26 CNC-milled into the surface of said second component 25b. It is noted that the first component 25a of the bipolar plate assembly 25 acts as the cathode in the cell below (i.e. in cell i+1 in the whole stack of the cells within the unit 100).

In Ti-frit type current collector elements traditionally employed in the electrolyzer cells, the effective surface area of the active recombining catalyst is very limited. At higher pressures, practically at pressures exceeding about 30 bar, during the operation of such cells, more and more hydrogen passes through the catalyst-coated membrane to the oxygen-side of the membrane. Thus, recombining hydrogen with oxygen becomes more and more difficult, and a simple coating (plating) applied on to the back side of the frit type current collector elements, as is the standard practice nowadays, cannot solve this problem.

Figure 15:
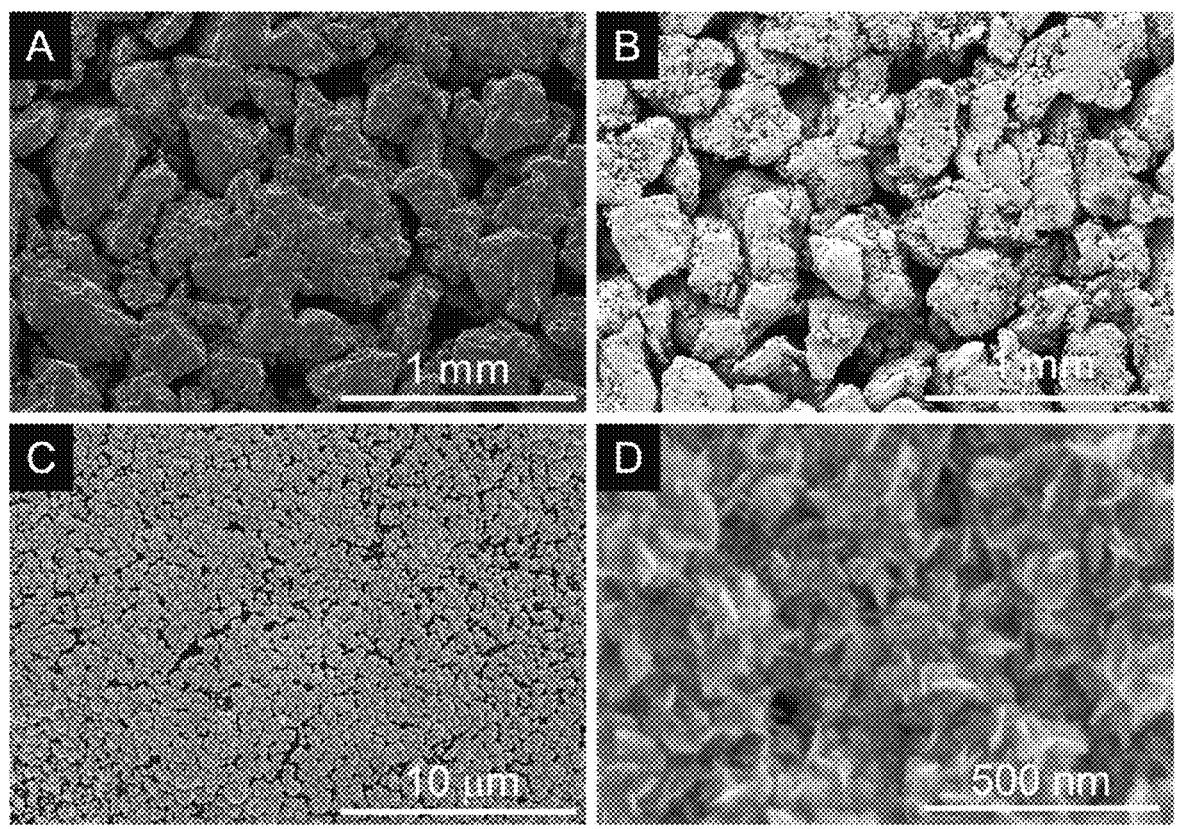
FIG. 15 is the top-view scanning electron microscopic image of a bare Ti-frit (image A) and a Pt-coated Ti-frit (images B, C and D) at different magnifications, used in the electrolyzer unit according to the invention as the material for the Ti-frit element(s) of the cell(s); and finally

According to the present invention, a catalyst-impregnated Ti-frit is employed on both the cathode- and anode-sides of the catalyst-coated membrane 5 between the membrane and the first/second component of the bipolar plate assembly 25 functioning as current collector plates in the unit. The Ti-frits 14, 15 are custom made from a powder of catalyst-coated Ti-particles. Three different Ti powders are used, with a typical average particle size of 50, 100, and 250 micrometers. The catalyst (Pt, Pd, different Pd—Pt alloys) is deposited by wet chemical methods on the surface of the Ti-particles (see the scanning electron microscopic image of FIG. 15A). The catalysts are nanoparticulate, and their size is controlled by the concentration of the metal precursor (for example $PtCl_6^{2-}$ in the case of Pt) and the reducing agent (for example $NaBH_4$). Subsequently, the frits are pressed from the powder with different sizes. When the frits thus obtained are arranged in the cells for the electrolyzing unit 100 according to the invention, the side of the Ti-frits with the smallest particle size is brought into contact with the catalyst-coated membrane, while the side of the Ti-frits with the largest Ti-particles will be brought into contact with said components 25a, 25b of the bipolar plate assembly 25 made of Ti. As all the Ti-particles get coated with the nanostructured catalysts before producing the frits, there will be a much higher contact area with the gas stream compared to the production scenario when only the back of the Ti-frit is coated (i.e. instead of surface recombination a quasi-volumetric recombination can take place). The frit pressed using the catalyst-coated Ti-particles is shown in the scanning electron microscopic images of FIG. 15B to 15D at different magnifications.

Figure 5:
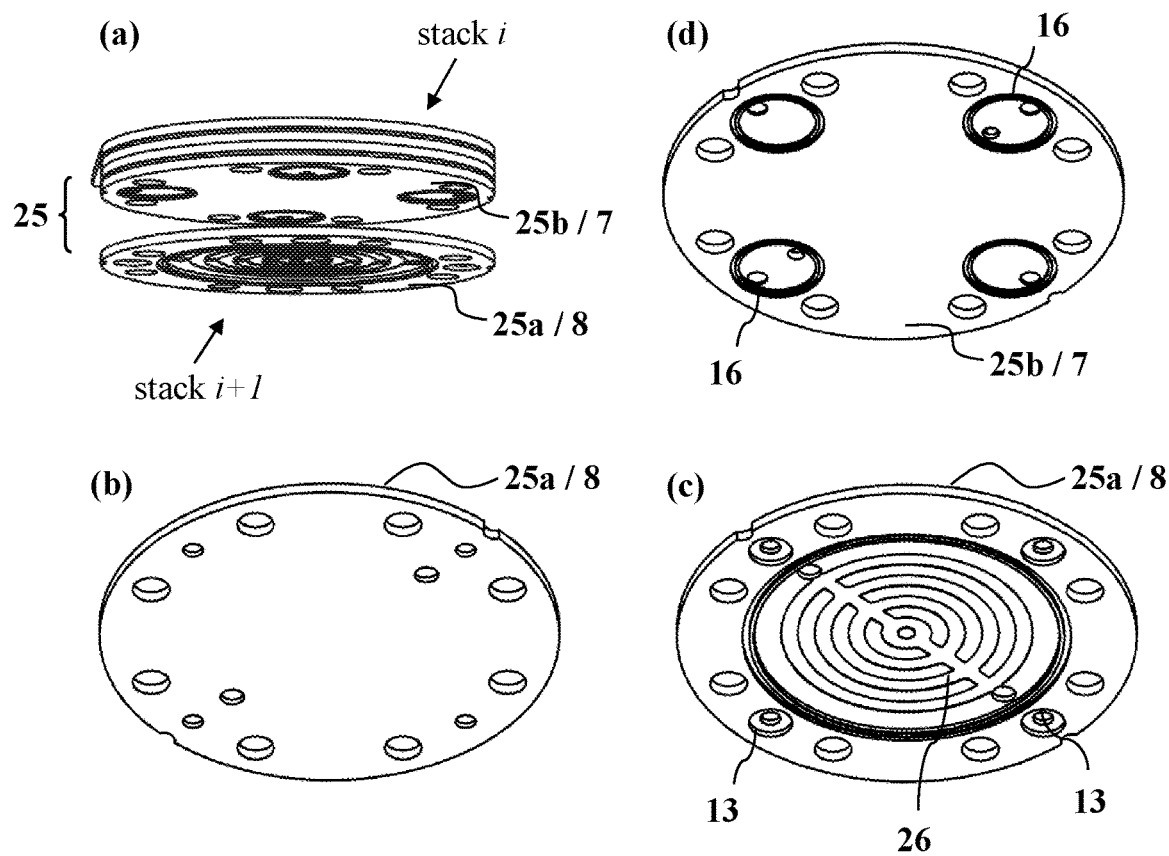
FIG. 5 illustrate a two-component bipolar plate assembly forming a first part of an intermediate electrolyzing cell (cell n+1) of the electrolyzer unit and a second part of an adjacent intermediate electrolyzing cell (cell n) of the electrolyzer unit in various views, in particular, insert (a) is an exploded view of the assembly, insert (b) is the top view of the first part, insert (c) is a bottom view of the first part and insert (d) is the bottom view of the second part.

FIG. 5 shows, in various views, the two-component bipolar plate assembly 25 according to the present invention with its first and second components 25a, 25b that form a first part of the intermediate electrolyzing cell 24 (cell i+1) and the second part of an adjacent intermediate electrolyzing cell 24 (cell i), respectively. In particular, insert (a) is an exploded view of the assembly 25, insert (b) is the top view of the first component, insert (c) is a bottom view of the first component and insert (d) is the bottom view of the second component. Here, said first component 25a actually corresponds to a $H_2$-side current collector plate 8 of the cell arranged as the second one from the cathode plate 4, while said second component 25b corresponds to an $O_2$-side current collector plate 7 of the adjacent cell arranged as the first one from the cathode plate 4. Some of the O-rings 16 and the channel sealing assemblies 13 arranged in the respective components of said bipolar plate assembly 25 in sealing position are also shown in the Figure.

Figure 6:
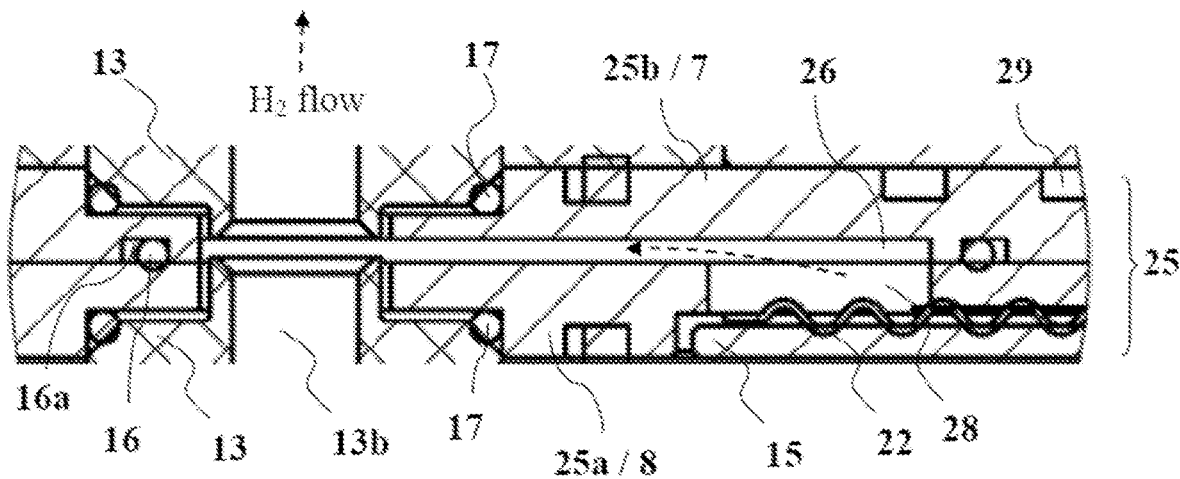
FIG. 6 is an enlarged partial cross-sectional view of the two-component bipolar plate assembly, taken along the line A-A of FIG. 1, that illustrates the system of flow channels and cavities through which water is introduced to the place within the electrolyzer unit wherein electrolysis and thus hydrogen generation takes place.

FIG. 6 is an enlarged partial cross-sectional view of the two-component bipolar plate assembly 25, taken along the line A-A of FIG. 1. The assembly 25 is made of the first component 25a and the complementary second component 25b that are actually the $H_2$-side current collector plate 8 and the $O_2$-side current collector plate 7, respectively, of two adjacent electrolyzing cells that are in fluid/gaseous communication with each other through flow channels 13b of the respective channel sealing assemblies 13 of said stack of the cells. To the flow channels 13b, a cavity 26 delimited by the first and second components 25a, 25b is connected providing fluid communication. Thus, a flow path comprising the flow channels 13b of the channel sealing assemblies 13 and the cavity 26 forms in the bipolar plate assembly 25 in its assembled state through which hydrogen is discharged (along broken arrows) from the gas channel 28 at the Ti-frit 15 where electrolysis and thus hydrogen generation takes place.

Components 25a, 25b of the bipolar plate assembly 25 are made of Ti. The plates of said components with the proper size are first cut, and then carefully polished. Subsequently, the cavities 26, the gas and liquid channels 28, 29, 13b, as well as the grooves 16a for accommodating the O-rings 16 are made by precision CNC milling.

Figure 14:
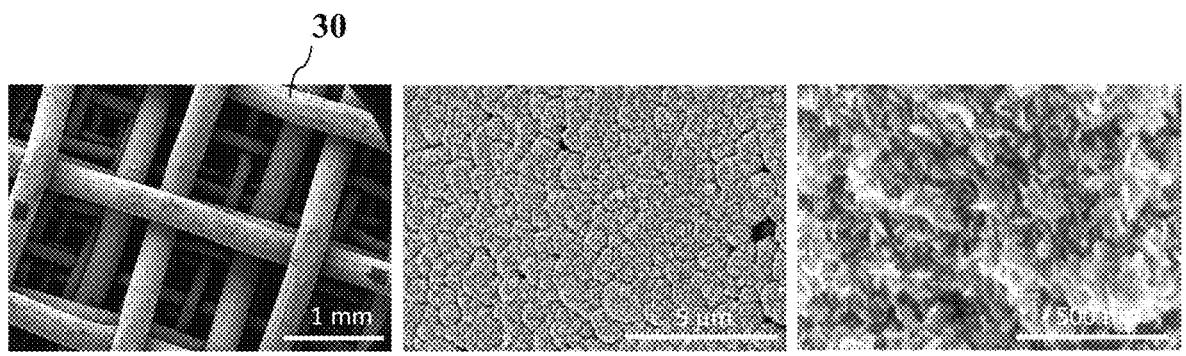
FIG. 14 shows scanning electron microscopic images of a Pt-coated Ti-mesh, taken at gradually increasing magnifications, used in the electrolyzer unit according to the invention as the $H_2/O_2$ recombiner element(s)

Most importantly, said cavities allow to integrate functional units into the electrolyzer unit 100 according to the invention for gas ($O_2$ or $H_2$) processing, which otherwise would have to be outside of the unit 100. For example, to increase the purity of the gas streams (both the $O_2$ and $H_2$), at least one $H_2/O_2$ recombiner 30 (acting in accord with $2H_2+O_2=2H_2O$) may be/is included into the cavities 26, in the form of an inert metal mesh with large surface, coated by nanostructured noble metal catalysts, preferably by electrodeposited platinum (Pt), palladium (Pd) or Pd/Pt alloys (with a coating thickness of 0.05 to 1.0 mg/cm$^2$, and to complete the catalytic reaction of $PtCl_6^{2-}+4e^-=Pt+6Cl^-$). The mesh itself is made, for example, from Ti, however, it can be prepared from any other metals such as nickel (Ni), niobium (Nb), as well, with, however, a different mesh density characteristic of the metal used to prepare the mesh). The $H_2/O_2$ recombiner 30 is integrated into both the anode and the cathode circuit to improve the purity of the $O_2$ and $H_2$ streams produced, respectively, by reacting the minor traces of the other gas counterpart (and thus forming water). The integration of the $H_2/O_2$ recombiner 30 into the unit 100 is further beneficial because of the elevated operational temperature (60° C.) and pressure of the unit/cells, which enhances the catalytic recombination reaction. Scanning electron microscopic (SEM) images of a Pt-coated Ti-mesh $H_2/O_2$ recombiner element are shown in FIG. 14 at gradually increasing magnifications.

Figure 7:
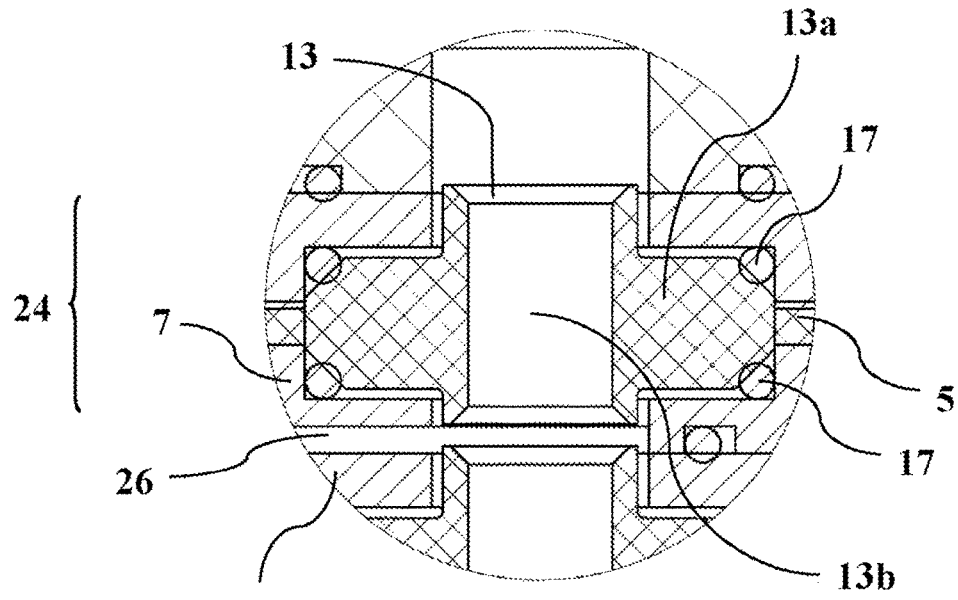
FIG. 7 illustrates a cross-sectional view of the channel sealing assembly used within the electrolyzer unit to ensure sealing between two catalyst-coated membranes arranged in two adjacent electrolyzing cells as well as to provide an adjustable spacer element to be matched with the thickness of said membranes.

FIG. 7 illustrates a cross-sectional view of the fluid channel sealing assembly 13 used within the electrolyzer unit 100. The channel sealing assembly 13 ensures the proper sealing between two catalyst-coated membranes 5 arranged in two adjacent electrolyzing cells 24. It further provides an adjustable spacer element that can be simply matched (by replacing it) with the thickness of said membrane, if in the case of changing the catalyst-coated membrane (e.g. at disassembling and then re-assembling the unit 100), the catalyst-coated membrane to be used would be of different thickness in comparison with the thick ness of the replaced one. In particular, different catalyst-coated membranes have generally different thickness, and also different catalyst-coatings result in different thickness of the catalyst-coated membrane 5. If the $H_2$ and water/$O_2$ transport channels in the unit 100, however, are sealed with a simple O-ring, the size of this O-ring has to match with the distance determined by the thickness of the catalyst-coated membrane 5 (ranging generally from 50-400 micrometers). If e.g. a new type of catalyst-coated membrane 5 has to be installed into the electrolyzer unit 100 (different purpose of application: high pressure, high purity, low resistance, etc., new supplier, etc.), all the metal components of the unit 100, such as e.g. the endplates, the current collector plates, etc., have to be re-manufactured, to ensure that there will be no leakage at higher pressures. To avoid this, the simple O-rings are substituted with the channel sealing assembly 13, made of a simple plastic body 13a (e.g. PEEK or ZX-100) with a longitudinal open-end channel 13b and two O-rings 17 arranged at the edges of the plastic body 13a (one at the top and another at the bottom) around the channel 13b when the channel sealing assembly 13 is arranged in its position within the unit 100. The channel 13b serves for the liquid transport between the adjacent electrolyzing cells 24. Here, the thickness (or height) of the plastic body 13a has to/can be tailored to the thickness of the catalyst-coated membrane 5 arranged in the given electrolyzing cell 24. All the other parts of the unit 100 remain unchanged. This allows to use the electrolyzer unit 100 according to the invention with catalyst-coated membranes 5 of different thickness. The plastic body 13a with the channel 13b therein is fabricated by simple CNC milling. The custom designed channel sealing assemblies 13 serve to seal the channels connecting the individual cells 24 in a fluidic/gaseous manner with one another.

The application of the channel sealing assembly 13 according to the present invention ensures unprecedented flexibility for the unit 100 in terms of the used catalyst-coated mem brane 5 compared to the state-of-the-art solutions, as replacement of the catalyst-coated membrane 5 does not necessitate re-manufacturing of other components of the unit 100. Moreover, this design of the channel sealing assembly 13 also ensures a watertight sealing of the catalyst-coated membrane 5. Furthermore, said channel sealing assembly 13 also functions as a strengthening member in the electrolyzing unit 100.

Figure 8:
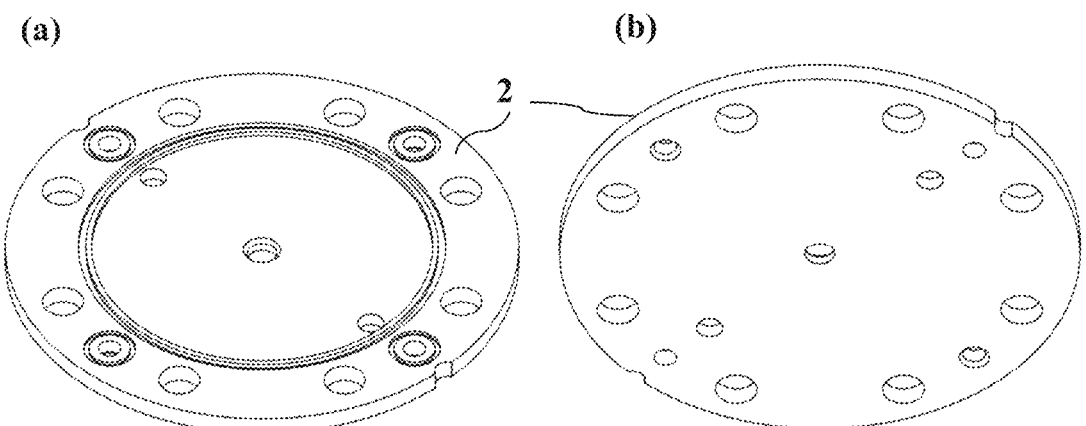
FIG. 8 shows the cathode side (top) pressure chamber plate in a perspective view from the bottom and the top in inserts (a) and (b), respectively.
Figure 9:
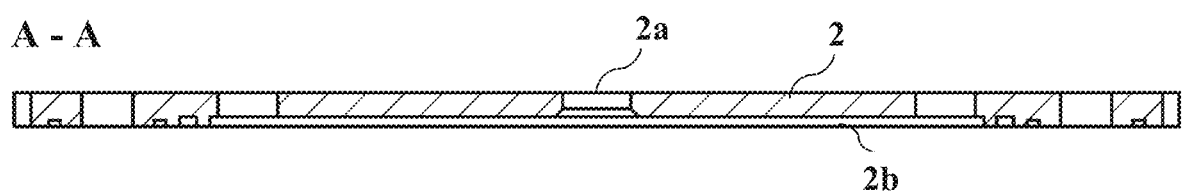
FIG. 9 is a cross-sectional view of the cathode side (top) pressure chamber plate taken along the line A-A of FIG. 1.

FIG. 8 shows the cathode side (top) pressure chamber plate 2 in a perspective view from the bottom and the top in inserts (a) and (b), respectively. FIG. 9 is a cross-sectional view of said pressure chamber plate 2 along the A-A section of FIG. 1. The pressure chamber plate 2 is provided with a recess, i.e. a pressure chamber 2b, on its surface facing towards the electrolyzing cells in the unit 100. To complete the $H_2$ channel structure, the pressure chamber 2b is in gaseous communication via a through hole 2a with the $H_2$ outlet 1a formed in the cathode-side endplate 1 (FIG. 1). The pressure chamber 2b and the through hole 2a are equally machined, preferably CNC-milled into said surface of the pressure chamber plate 2. As is, however, clear to a skilled person in the art, the pressure chamber 2b with its communication through hole 2b may be directly formed in the respective surface of the endplate 1, too. The pressure chamber plate 11 with a pressure chamber 11b (see FIG. 3B) arranged at the anode-side endplate 12 is similar in design to the pressure chamber plate 2, but there is no communication through hole formed therein.

The two pressure chamber plates 2, 11 are optional elements that are included in the design in addition to the components necessary to operate. These special elements, or rather the pressure chambers present (either in the pressure chamber plates or directly in said endplates if the pressure chamber plates are omitted from the construction) provide adaptive pressure control on the stack from both sides, thus providing uniform pressure distribution throughout the cells of the stack. Importantly, neither moving parts (such as pistons or valves) nor elastic plastic elements are applied to achieve the adaptive pressure control. Furthermore, unlike any external pressure control, the application of pressure chambers at the endplates within the electrolyzer unit is inherently safe, because the pressure in these chambers can never be higher than that generated in the electrolyzing cells. Nevertheless, to ensure a pressure independent electrochemical performance, it was found that both pressure chambers are needed.

Figure 13A:
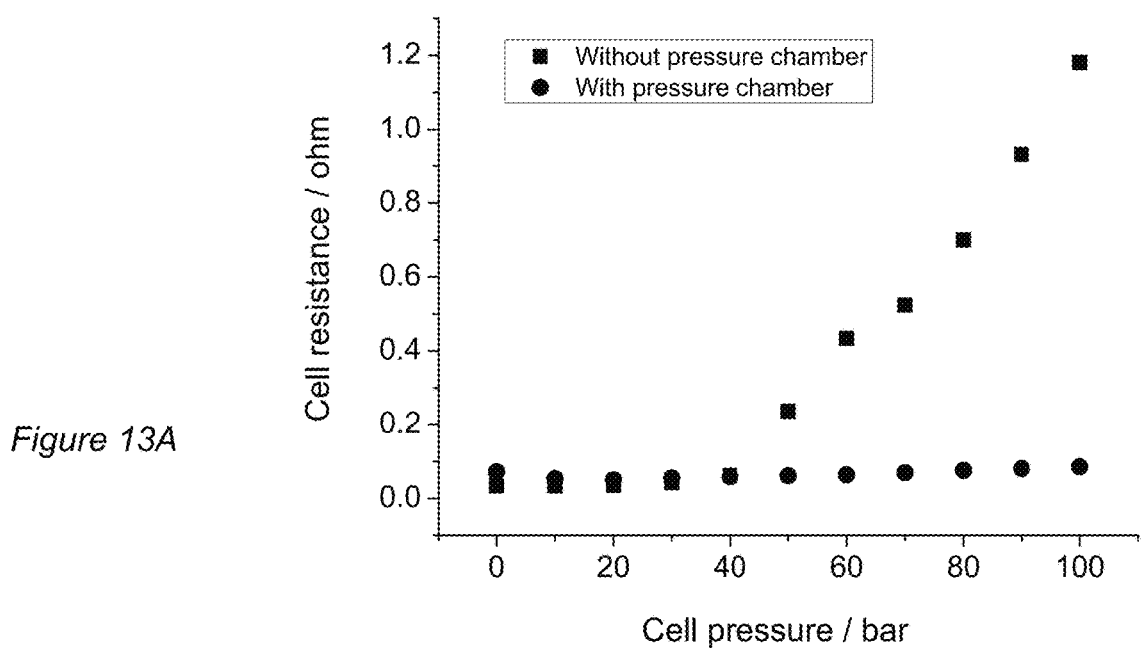
FIG. 13A illustrates the cell resistance as a function of the cell pressure with (stars) and without (solid squares) pressure chamber plates based on electrochemical impedance spectroscopy measurements of the electrolyzer unit according to the invention.

This novel construction eliminates deformation of the electrolyzing cells in the stack and thus avoids the decrease in the contact area between the catalyst-coated membrane/ Ti-frit, Ti-Frit/Ti-plate. This results in a stable cell resistance even at elevated pressures, as shown in FIG. 13A presenting the cell resistance as a function of the cell pressure with (stars) and without (solid squares) the pressure chambers of the electrolyzer unit according to the invention. Here, the plotted cell resistance values were extracted from electrochemical impedance spectroscopy data, collected at open circuit voltage, at a potential modulating amplitude of 10 mV. Full electrochemical impedance spectra were recorded at ten different pressure values (1-100 bar), achieved by externally filling the cells of the unit with $H_2$. As can be seen from the diagram, without pressure chambers, the resistance of the electrolyzer unit increased from 0.08Ω to 1.2Ω when the pressure was being increased from atmospheric pressure to 100 bar, while it remained almost constant with said pressure chambers clearly exerting a counterpressure to the stack cells. When only one pressure chamber is applied (either at the anode- or at the cathode-side of the cell), some improvement can still be observed, however, both pressure chambers are necessary to completely avoid deformation of the cells of the stack in the electrolyzer unit.

Figure 13B:
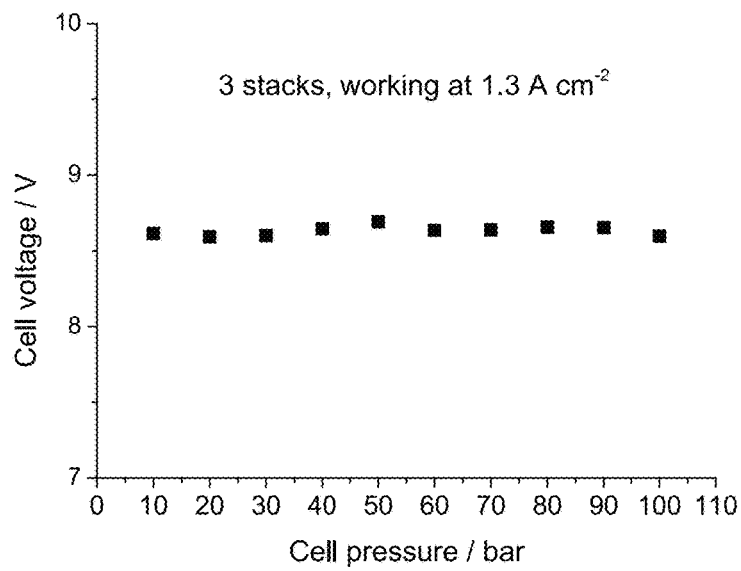
FIG. 13B illustrates the cell operational voltage at room temperature (25° C.) without iR-compensation at various cell pressures in the range of 1 to 100 bar for a 3-cell electrolyzer unit according to the invention.

The constant resistance of the unit leads to energy-efficient operation even at high pressure values, and no external pressure build-up is needed when the pressure chambers are applied. The former is illustrated in FIG. 13B that presents the performance (operational voltage) of a 3-cell electrolyzer unit according to the invention at room temperature (25° C.) and without compensating the internal resistance of the unit (i.e. iR compensation), operating at 1.25 $Acm^2$ current density, as a function of the built-up differential pressure (i.e. the pressure difference between the cathode- and anode-sides of the catalyst-coated membrane) in the range of 1 to 100 bar. It is clearly visible that the necessary unit voltage does not change as a function of the pressure.

Figure 11:
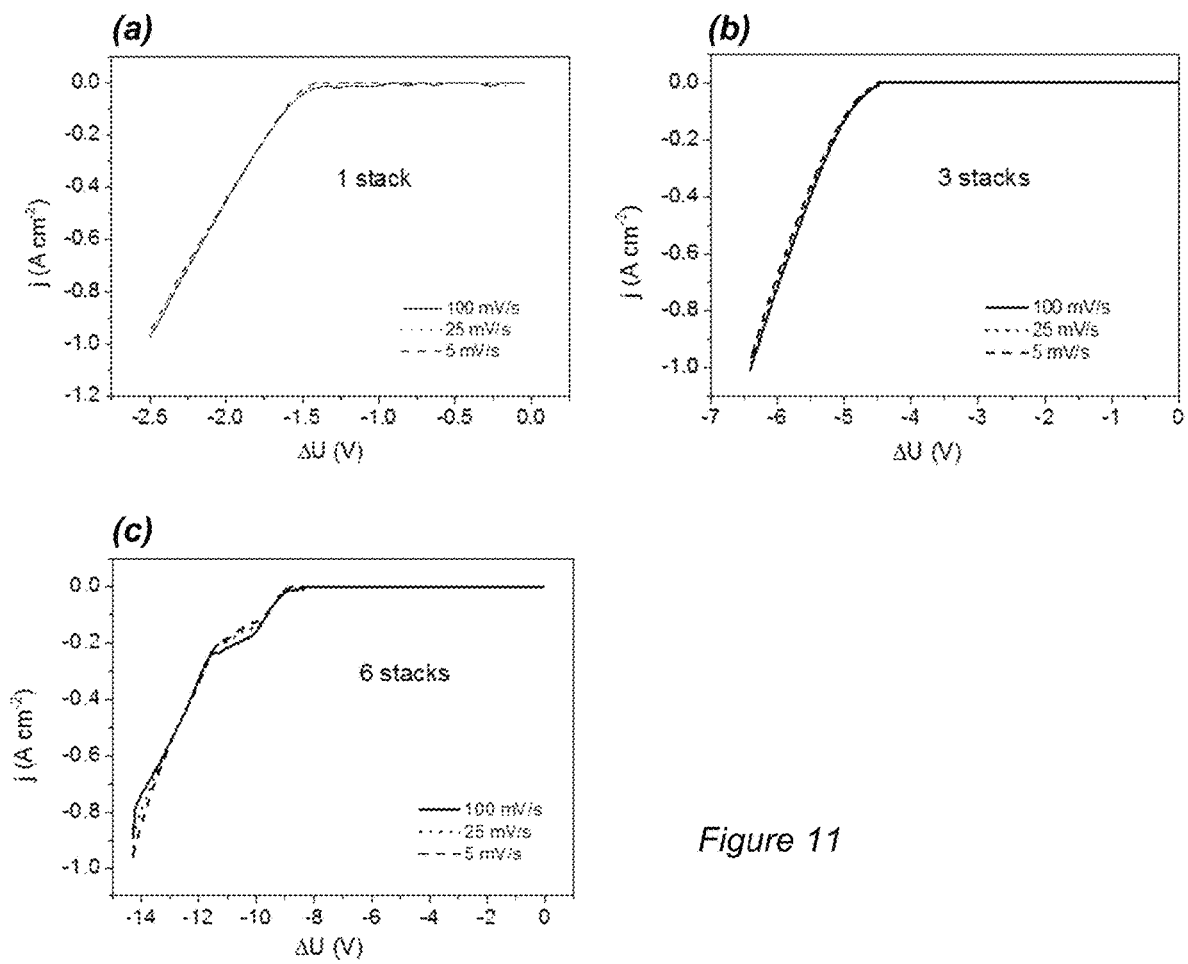
FIG. 11 shows the current/voltage characteristics for electrolyzer units according to the present invention comprising various numbers of electrolyzing cells, in particular one [plot (a)], three [plot (b)] and six [plot (c)] cells.
Figure 12:
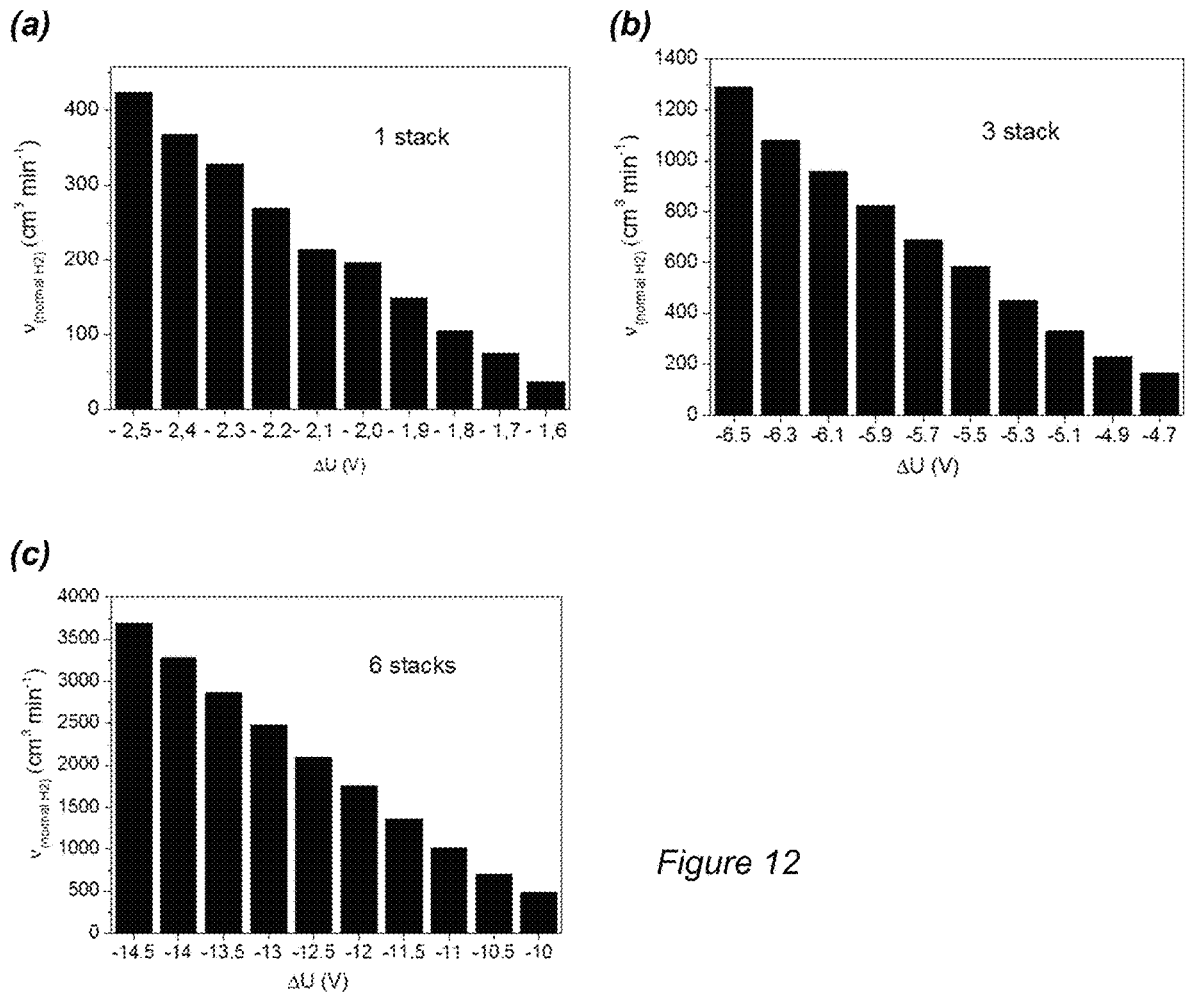
FIG. 12 shows the $H_2$-generation performance of electrolyzer units according to the present invention comprising various numbers of electrolyzing cells, in particular one [plot (a)], three [plot (b)] and six [plot (c)] cells.

To illustrate the operation of the electrolyzer unit according to the invention, the current flown through the unit was monitored as a function of the applied voltage. FIG. 11 shows the current/voltage characteristics for electrolyzer units according to the present invention comprising various numbers of electrolyzing cells, in particular one [plot (a)], three [plot (b)] and six [plot (c)] cells, at the pressure of 1 atm. The water fed was fixed at 0.5 L/min. The experiment was performed at room temperature (25° C.), with no iR compensation. The cell voltage was swept with the rates indicated in the Figure. The catalyst-coated membrane area was 60 $cm^2$/cell. Furthermore, FIG. 12 shows the $H_2$-generation performance of electrolyzer units according to the invention comprising various numbers of electrolyzing cells, in particular one [plot (a)], three [plot (b)] and six [plot (c)] cells. (45 $cm^2$/each). $H_2$ flow rates were recorded as a function of the applied voltage. The water fed was fixed at 0.5 L/min. The experiment was performed at room temperature (25° C.), with a catalyst-coated membrane area of 60 $cm^2$/cell and without any compensation of the internal resistance of the unit.

The curves of the Figures were registered at different voltage sweep rates (i.e. speed of the voltage change). The almost perfect overlap of the curves prove the good behavior of the unit (i.e. no mass transport limitation occurs) independent of the number of electrolyzing cells employed. This behavior confirms that the electronic, geometric and mechanical attributes of the electrolyzer unit according to the invention ensures excellent performance in both single- and multi-cell configurations.

Figure 16:
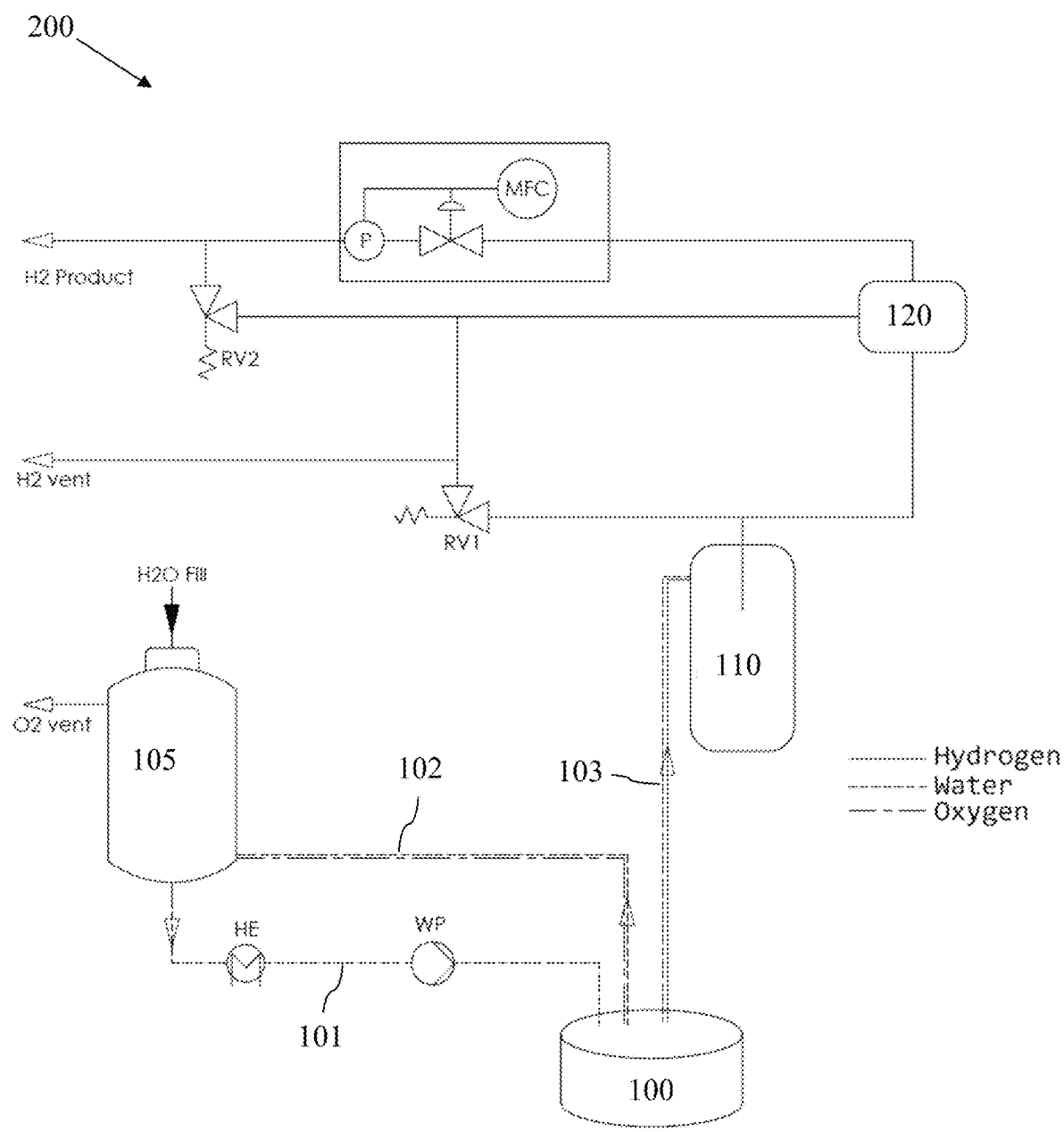
FIG. 16 is a diagrammatic layout of an exemplary hydrogen generator comprising an electrolyzer unit according to the present invention.

FIG. 16 illustrates schematically a simple exemplary hydrogen generator 200 according to the invention. The hydrogen generator 200 comprises a source of water, here a water tank 105, to continuously supply water, as feedstock, for hydrogen generation by means of electrolysis taking place in the electrolyzer unit 100 according to the invention. The water tank 105 is in fluid communication with the electrolyzer unit 100 via a suitable system of conduits. The tank 105 may also supply more than one electrolyzer units at a time through said system of conduits, either simultaneously or in a batch mode, one after the other, as is clear for a skilled person in the art. In particular, with reference to FIG. 1, the water tank 105 is connected to the water inlet 1b of the electrolyzer unit 100 through a suitable conduit 101. The water tank 105 is filled with water continuously or periodically through a separate inlet in accordance with the actual rate of water consumption. Feeding of water into the unit 100, as well as the feeding rate itself are governed by a pump WP inserted into the conduit 101. Optionally, to adjust the temperature of the water fed into the unit 100, a heat exchanger HE may also be inserted into the conduit 101. To collect the excess water mixed with oxygen leaving the electrolyzer unit 100, the tank 105 is in fluid communication through a conduit 102 with the water/oxygen outlet 1b' of the electrolyzer unit 100, too. Hence, the excess water is recirculated to the tank 105 and recycled. The oxygen entering the tank 105 with the excess water accumulates in a top region of the tank 105 and is vented from the tank 105 from time to time through a separate oxygen outlet; venting may take place continuously, as well.

Water is fed to the anode side of the unit 100 from the water tank 105 by operating the pump WP. The water is then oxidized in the anode compartments of the electrolyzing cells (here the process $H_2O-2e^-=2H^++0.5O_2$ takes place), and circulated back to the water tank 105 with the excess water through the $O_2$/water channel, which goes through the unit, connects the individual electrolyzing cells, and finally opens into the conduit 102 though the outlet 1b'. The $H_2$ gas is generated in the cathode compartments of said cells by reducing $H_3O^+$ ions (through the process $2H_3O^++2e^-=H_2+2H_2O$) transported from the respective anode sides through the catalyst-coated cation exchange membrane. The thus generated $H_2$ gas leaves the cells through the $H_2$ channel within the unit 100 and then exit the unit 100 through the (one or more) hydrogen outlet 1a into a conduit 103 that may transport the gaseous hydrogen to a place of further processing, i.e. optionally for drying, if required. It should be here, nevertheless, noted that due to the manner the $H_2$ gas gets generated and the construction of the electrolyzer unit according to the invention (e.g. the application of pressure chamber plates within the unit), the $H_2$ gas obtained is of very high purity and devoid of impurities. The $H_2$ gas obtained actually contains some water vapor. To remove the water content, the $H_2$ gas is subjected to mechanical and thermal water separation in mechanical and thermal water separators 110, 120, respectively. To this end, the $H_2$ gas is transported through the conduit 103 to the mechanical water separator 110 and then to the thermal water separator 120. In said mechanical water separator 110, the liquid phase water is mechanically separated from the gaseous hydrogen. In said thermal water separator 120, the gaseous hydrogen is cooled below its dew point, and the remaining water is condensed thereby. The thermal water separator 120 is preferably realized as a Peltier cooler. From the separator 120, a completely dewatered gaseous hydrogen (with a high purity of 99.99%) exits. The pure $H_2$ gas is subsequently delivered to the users through a mass-flow controller MFC, which ensures the requested pressure and flow rate. In addition, there are various safety lines with appropriately designed relief valves RV1, RV2 for $H_2$ vent in the case of any malfunction. In FIG. 16, to improve intelligibility, the ways for transporting the hydrogen, water and oxygen are represented with different line types, as is indicated in FIG. 16 itself.

BRIEF SUMMARY

As is clear from the above detailed discussion, the present invention provides:

controllable differential pressures (1-130 bar) on the $H_2$ (cathode) side relative to the $O_2$ (anode) side (which is typically kept at 1 atm pressure);

controllable $H_2$ production rates (depending on the size and the applied current density, 20-5000 $cm^3$/stack);

variability in the dimension and/or the number of electrolyzing cells in a wide range, the latter may vary between 1 and 10, preferably between 3 to 8;

applicability of catalyst-coated membranes in the cells, wherein the membrane is a cation exchange membrane, the cathode catalyst is Pt/C and the anode catalyst is $Ir/IrO_x$;

applicability of complex sealing mechanisms using both conventional and custom designed O-rings and O-ring assemblies;

the employment of a specific channel sealing assembly in the unit which is adjustable in height (i) to provide sealed gas and liquid channels for the water/hydrogen/oxygen transport amongst the individual electrolyzing cells and (ii) to enable the use/replacement of/for catalyst-coated membranes with thicknesses in a wide range, i.e. with different thicknesses and, thus, to provide high flexibility in restructuring the electrolyzer unit according to needs, and (iii) to function as a strengthening member within the unit;

applicability of special (top and bottom) pressure chamber plates/pressure chambers adjacent to the respective endplates which provide the exact same pressure on the stack of cells what is generated inside each cell, and thereby the mechanical distortion of the stack of cells is avoided which allows excellent $H_2$ generation performance at high pressures as well without a decrease in the $H_2$ flow-rate;

the usage of bipolar plate assemblies assembled from two components, that allows to make said plates thinner, because flow channels can be integrated into the bulk of the plates in an innovative way, that is, with no need to construct a plurality of through channels; moreover, cavities can be introduced inside the bipolar plates that, on the one hand, act as channels to stream the gas and the liquid (that is, water), but on the other hand, can host functional components inside the unit;

integrability of $H_2/O_2$ recombiner units into said cavities formed in said bipolar plates to enhance gas purity with no need for additional units outside of the electrolyzer unit;

the employment of custom designed gas-diffusion layers in the form of Ti-frits pressed from Ti-particles that are coated by $H_2/O_2$ recombination catalyst prior to the pressing to allow the minority component in the gas streams to react with the majority component forming water and thus, to result in $H_2$ production with high purity (99.99%).

Furthermore, as is also clear to a person skilled in the art, the present inventive solutions, either considered alone or in any combination, are not limited to the exemplified embodiments, i.e. the electrolyzer units for generating gaseous hydrogen, but can also be applied e.g. to $O_2$ generators and other electrochemical setups (such as e.g. fuel cells).

The invention claimed is:

1. An electrolyzer unit (100) to generate gaseous hydrogen from water via electrolysis, comprising:
    at least one electrolyzing cell (24) to perform the electrolysis of water;
    a cathode plate (4) and an anode plate (9) sandwiching the at least one electrolyzing cell (24) and arranged in close contact with opposite sides of said at least one electrolyzing cell (24);
    a cathode insulation plate (3) arranged over the cathode plate (4) in close contact with the cathode plate (4);
    an anode insulation plate (10) arranged over the anode plate (9) in close contact with the anode plate (9);
    a cathode-side endplate (1) arranged over the cathode insulation plate (3) in close contact with the cathode insulation plate (3), said cathode-side endplate (1) is provided with a water inlet (1*b*), a hydrogen outlet (1*a*), and a water/oxygen outlet (1*b*');
    an anode-side endplate (12) arranged over the anode insulation plate (10) in close contact with the anode insulation plate (10);
    wherein individual ones of the at least one electrolyzing cell (24) are defined by a first two-component bipolar plate assembly (25) and a second two-component bipolar plate assembly (25') arranged adjacent to one another and comprise:
    a first component (25*a*) of the first bipolar plate assembly (25) to act as cathode of a respective cell;
    a second component (25*b*) of the second bipolar plate assembly (25') to act as anode of said respective cell, the second component (25*b*) being complementary to the first component (25*a*), wherein cavities (26) are formed in said first and second components (25*a*, 25*b*);
    a proton conducting membrane (5) arranged between said first and second components (25*a*, 25*b*), wherein the proton conducting membrane (5) comprises a catalyst-coated membrane, and is sandwiched between titanium-frit plates (14, 15) on both sides, wherein the titanium-frit plates (14, 15) are made of titanium particles of different average particle size by pressing, wherein said titanium particles are coated with a catalyst, said catalyst being a nanoparticulate catalyst;
    a first channel sealing assembly (13) to provide fluid communication therethrough between a water receiving cavity of the first component (25*a*) and said water inlet (1*b*) through a water transport channel (13*b*) and to provide a sealing of the membrane (5);
    a second channel sealing assembly (13) to provide gaseous communication therethrough between a hydrogen receiving cavity of the first component (25*a*) and said hydrogen outlet (1*a*) through a hydrogen transport channel (28);
    a third channel sealing assembly (13) to provide gaseous communication between an oxygen receiving cavity of the second component (25*b*) and said oxygen outlet (1*b*') through a water/oxygen transport channel (29) and to provide a sealing of the water receiving cavity and the hydrogen receiving cavity.

2. The electrolyzer unit (100) according to claim 1, wherein a cathode-side pressure chamber (2*b*) is formed between the cathode-side endplate (1) and the cathode-side insulation plate (3), and an anode-side pressure chamber (11b) is formed between the anode-side endplate (12) and the anode-side insulation plate (10).

3. The electrolyzer unit (100) according to claim 2, wherein the cathode-side pressure chamber (2b) is formed in a plate (2) inserted between the cathode-side endplate (1) and the cathode-side insulation plate (3).

4. The electrolyzer unit (100) according to claim 2, wherein the anode-side pressure chamber (11b) is formed in a plate (11) inserted between the anode-side endplate (12) and the anode-side insulation plate (3).

5. The electrolyzer unit (100) according to claim 1, wherein a hydrogen/oxygen recombiner element (30) is arranged within the water receiving cavity and the oxygen receiving cavity.

6. The electrolyzer unit (100) according to claim 5, wherein the hydrogen/oxygen recombiner element (30) is a mesh.

7. The electrolyzer unit (100) according to claim 6, wherein the mesh is provided in the form of a platinum coated titanium mesh.

8. The electrolyzer unit (100) according to claim 1, wherein the at least one electrolyzing cell (24) at most ten electrolyzing cells.

9. The electrolyzer unit (100) according to claim 1, wherein the channel sealing assemblies (13) comprise a body (13a) with a longitudinal through bore (13b) formed therein and first and second O-rings (17) arranged at the upper and lower edges of the body (13a) around said through bore (13b).

10. A hydrogen generator (200) comprising a water source (105), a hydrogen outputting means, an oxygen outputting means and at least one electrolyzer unit (100) according to claim 1 in fluid communication with the water source (105), and in gaseous communication with the hydrogen outputting means and the oxygen outputting means.

11. The hydrogen generator (200) according to claim 10, wherein a mechanical water separator (110) is inserted between the electrolyzer unit (100) and the hydrogen outputting means.

12. The hydrogen generator (200) according to claim 11, wherein a thermal water separator (120) is inserted between the mechanical water separator (110) and the hydrogen outputting means.

* * * * *